United States Patent [19]

Noda

[11] Patent Number: 4,568,201

[45] Date of Patent: Feb. 4, 1986

[54] TEMPERATURE MEASURING APPARATUS

[75] Inventor: Tomimitsu Noda, Nagoya, Japan

[73] Assignee: Tokyo Shibaura Denki Kabushiki Kaisha, Kawasaki, Japan

[21] Appl. No.: 502,727

[22] Filed: Jun. 9, 1983

[30] Foreign Application Priority Data

Jun. 11, 1982 [JP] Japan .................. 57-100319

[51] Int. Cl.$^4$ .............................................. G01J 5/00
[52] U.S. Cl. ...................... 374/128; 374/121; 374/120
[58] Field of Search ............... 374/128, 121, 126, 130, 374/133, 170, 171, 172, 173, 149; 250/350; 356/43; 219/10.55 B, 10.55 F, 10.55 R, 10.55 M

[56] References Cited

U.S. PATENT DOCUMENTS

| 3,163,700 | 12/1964 | Williamson . | |
|---|---|---|---|
| 3,179,805 | 4/1965 | Astheimer . | |
| 3,777,568 | 11/1973 | Risgin et al. . | |
| 4,049,938 | 9/1977 | Ueno | 219/10.55 F |
| 4,191,876 | 3/1980 | Ohkubo et al. | 374/149 |
| 4,245,143 | 1/1981 | Miura et al. | 219/10.55 F |
| 4,383,157 | 5/1983 | Nakata et al. | 219/10.55 B |
| 4,461,941 | 7/1984 | Fukuda et al. | 219/10.55 F |

FOREIGN PATENT DOCUMENTS 2082767  3/1982  United Kingdom .

OTHER PUBLICATIONS

Patent Abstracts of Japan, vol. 4, No. 168, Nov. 20, 1980.
Patent Abstracts of Japan, vol. 4, No. 118, Aug. 22, 1980.
Patent Abstracts of Japan, vol. 2, No. 84, Jul. 8, 1978.

Primary Examiner—Steven L. Stephan
Assistant Examiner—David R. Schuster
Attorney, Agent, or Firm—Cushman, Darby and Cushman

[57] ABSTRACT

An infrared sensor made of LiTaO3 is provided on a ceiling of a heating chamber of a microwave oven, and a chopper is provided so as to intermittently block infrared radiation emitted from food in the heating chamber. The infrared sensor is brought to face the food and the chopper alternately and provides a corresponding AC output signal. The temperature of the chopper is detected from the output signal of a separately provided chopper temperature sensor consisting of a thermister. The detected chopper temperature output signal is corrected in a microcomputer to be substantially in accord with chopper temperature components in the output signal of the infrared sensor. The corrected chopper temperature data is applied to the infrared sensor output data for removing the chopper temperature components from the output signal of the infrared sensor to obtain a food temperature signal corresponding to the sole temperature of the food.

4 Claims, 5 Drawing Figures

TEMPERATURE MEASURING APPARATUS

BACKGROUND OF THE INVENTION

This invention relates to a temperature measuring apparatus for detecting temperature of an object and, more particularly, a temperature measuring apparatus suitable for a microwave oven.

In a microwave oven, magnetron energizing control for generating microwave energy to heat food is carried out in response to food temperature. A conventional temperature measuring apparatus for a microwave oven comprises an infrared sensor, a chopper, a chopper temperature sensor, and a signal processing circuit. More particularly, the food temperature is usually detected indirectly with the infrared sensor, which consists of an infrared-sensitive material LiTaO$_3$, for instance, and is provided on the ceiling of a heating chamber with its detecting surface directed toward the food. Infrared radiation emitted from the food is intermittently blocked by the chopper which is provided between the infrared sensor and food. While the radiation from the food is blocked, it does not reach the infrared sensor. During this time, however, a certain amount of infrared radiation is emitted from the chopper. The infrared sensor thus detects infrared radiation from the food and that from the chopper alternately, so that it produces an AC output signal varying between alternate high and low levels according to the amount of the incident infrared radiation. The chopper temperature sensor comprising a thermistor, for instance, is provided separately to obtain a signal representing the chopper temperature or ambient temperature of the chopper. The signal processing circuit carries out arithmetic operations (subtraction/addition) in an analogue manner so as to derive a food temperature signal for the magnetron energizing control from output signals of the infrared sensor and the chopper temperature sensor. However, the infrared sensor output y does not vary with a linear function $y = x_f$ of the food temperature $x_f$(°C.) as shown by a dashed line in FIG. 1 but varies with a function $y = f(x_f)$ shown by a solid curve.

The infrared sensor output voltage is also subject to the chopper temperature. If the chopper temperature $x_{cp}$(°C.) is taken into account and the temperature measuring apparatus operates on condition that the infrared emissivity of the chopper is considered to be substantially identical to that of the food while the chopping duty cycle is 50 percent, then the infrared sensor output y is given as $$y = |f(x_f) - f(x_{cp})| \quad (1)$$

where the absolute value expression in equation (1) represents an output of a full wave rectifier in the signal processing circuit. A dot-dash curve shown in FIG. 1 indicates the equation (1). The solid curve for $y = f(x_f)$ is obtained when $f(x_{cp}) = 0$, i.e., when the chopper temperature is 0° C.

The infrared sensor output y given by the equation (1) greatly differs from the linearized plot for $y = x_f$. In addition, the sensitivity characteristics of the infrared sensor are basically different from those of the chopper temperature sensor. Accordingly, the conventional temperature measuring apparatus above-mentioned can not always provide an accurate food temperature signal over a wide temperature range.

SUMMARY OF THE INVENTION

An object of the invention is to provide a highly reliable temperature measuring apparatus, which can accurately measure the temperature of an object without being influenced by chopper temperature changes.

To attain the above object, according to the invention there is provided a temperature measuring apparatus, comprising:

a chopper for intermittently blocking infrared radiation emitted from an object in accordance with a predetermined chopping duty cycle;

a chopper temperature sensor for measuring temperature of the chopper;

an infrared sensor including a receiving surface for receiving infrared radiation from the object and the chopper alternately;

said infrared sensor producing an electric output signal consisting of object temperature components and chopper temperature components; and a control circuit for deriving a signal corresponding to temperature of the object from output signals of the chopper temperature sensor and the infrared sensor, the control circuit including a device for correcting the output signal of said chopper temperature sensor to be substantially in accord with the chopper temperature components in the output signal of the infrared sensor, and a device for substantially removing the chopper temperature components from the output signal of the infrared sensor by applying an output signal of the correcting device to the output signal of the infrared sensor.

DETAILED DESCRIPTION OF THE PREFERRED EMBODIMENT

The invention will now be described in conjunction with an embodiment thereof with reference to the drawings.

Figure 1:
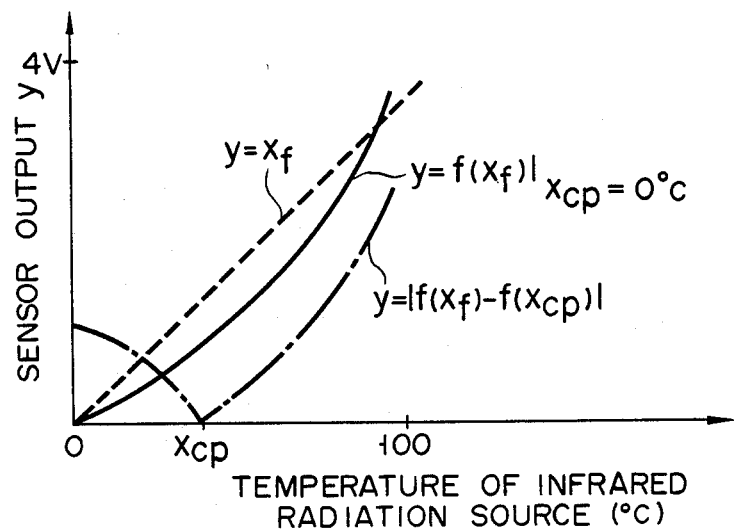
FIG. 1 shows output characteristics of an infrared sensor.
Figure 2:
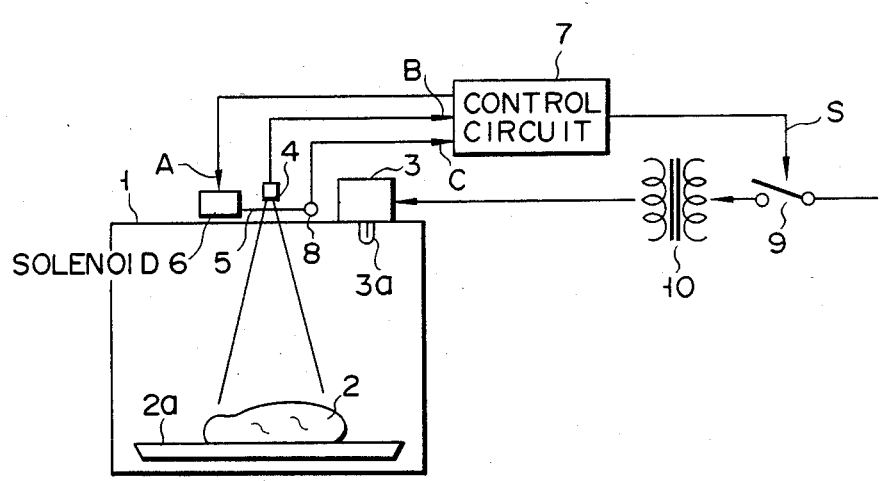
FIG. 2 is a schematic diagram of an embodiment of the invention.

FIG. 2 schematically shows an embodiment of the invention applied to a microwave oven in which food temperature is measured to properly heat food to be cooked. Food 2 is placed on a food table 2a in a heating chamber 1 of a microwave oven. A magnetron 3 for generating microwave energy is provided on a ceiling of the heating chamber 1, and an antenna 3a projects into the heating chamber 1.

The heating chamber 1 has an infrared permeable window, which is impermeable to microwave energy, provided substantially at the center of its ceiling. An infrared sensor 4 made of an infrared sensitive material LiTaO$_3$, for instance, is disposed outside the heating chamber 1 with its receiving surface directed toward the food 2 to detect infrared radiation passing through the infrared permeable window. A chopper 5 is interposed between the infrared permeable window and the infrared sensor 4. It is alternatively movable between two positions by a solenoid 6. In one of the two positions, it blocks infrared radiation from the food 2 so that the radiation from the chopper 5 is only incident on the infrared sensor 4. In the other position, it allows the infrared radiation from the food 2 to be incident on the infrared sensor 4. The solenoid 6 is driven in response to a drive signal A supplied from a control circuit 7. Accordingly, the infrared sensor 4 produces an electric output signal B corresponding in level to resultant infrared intensity of the chopper 5 and the food 2.

A chopper temperature sensor 8 consisting of a thermistor is provided in the vicinity of the chopper 5. It produces an electric output signal C corresponding to the temperature of the chopper 5. The output signals B and C are respectively fed to the control circuit 7. The control circuit 7 determines the temperature of the food 2 from the output signals B and C, and provides an on-off control signal S to a relay switch 9 according to a programmed temperature so that the food 2 may be heated satisfactorily. The relay switch 9 and a high voltage transformer 10 are connected to a power source circuit of the magnetron 3. The microwave output level of the magnetron 3 is controlled through the control of conduction period of the relay switch 9 in response to the signal S.

In this embodiment, the control circuit 7 processes the output signal of the chopper temperature sensor 8 to derive therefrom data substantially identical to those in accordance with the output (sensitivity) characteristics of the infrared sensor 4. The control circuit 7 further operates to provide a linearlized temperature signal with respect to the food in response to output signals of the chopper temperature sensor 8 and the infrared sensor 4 which, in turn, is used for the on-off control signal S.

Figure 4:
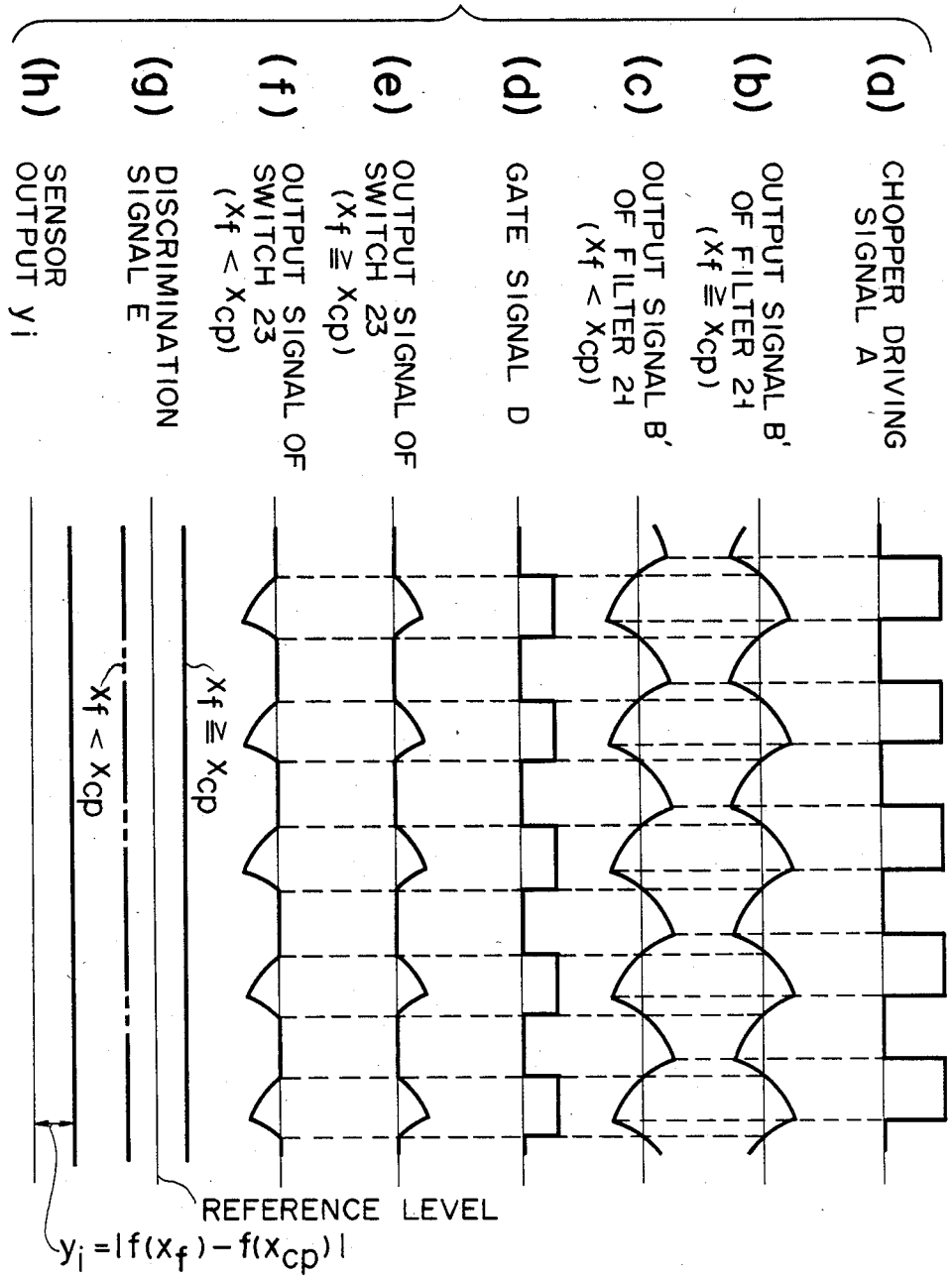
FIG. 4 is a time chart for explaining the operation of the circuit of FIG. 3.
Figure 5:
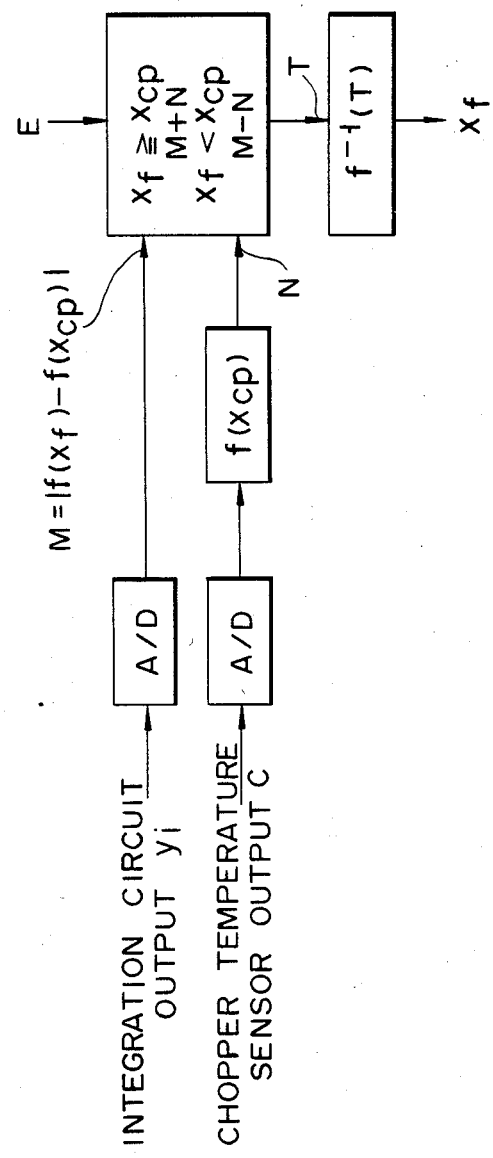
FIG. 5 shows a function diagram of a microcomputer shown in FIG. 3.

The construction and operation of the control circuit 7 will now be described in detail with reference to FIGS. 3 through 5.

Figure 3:
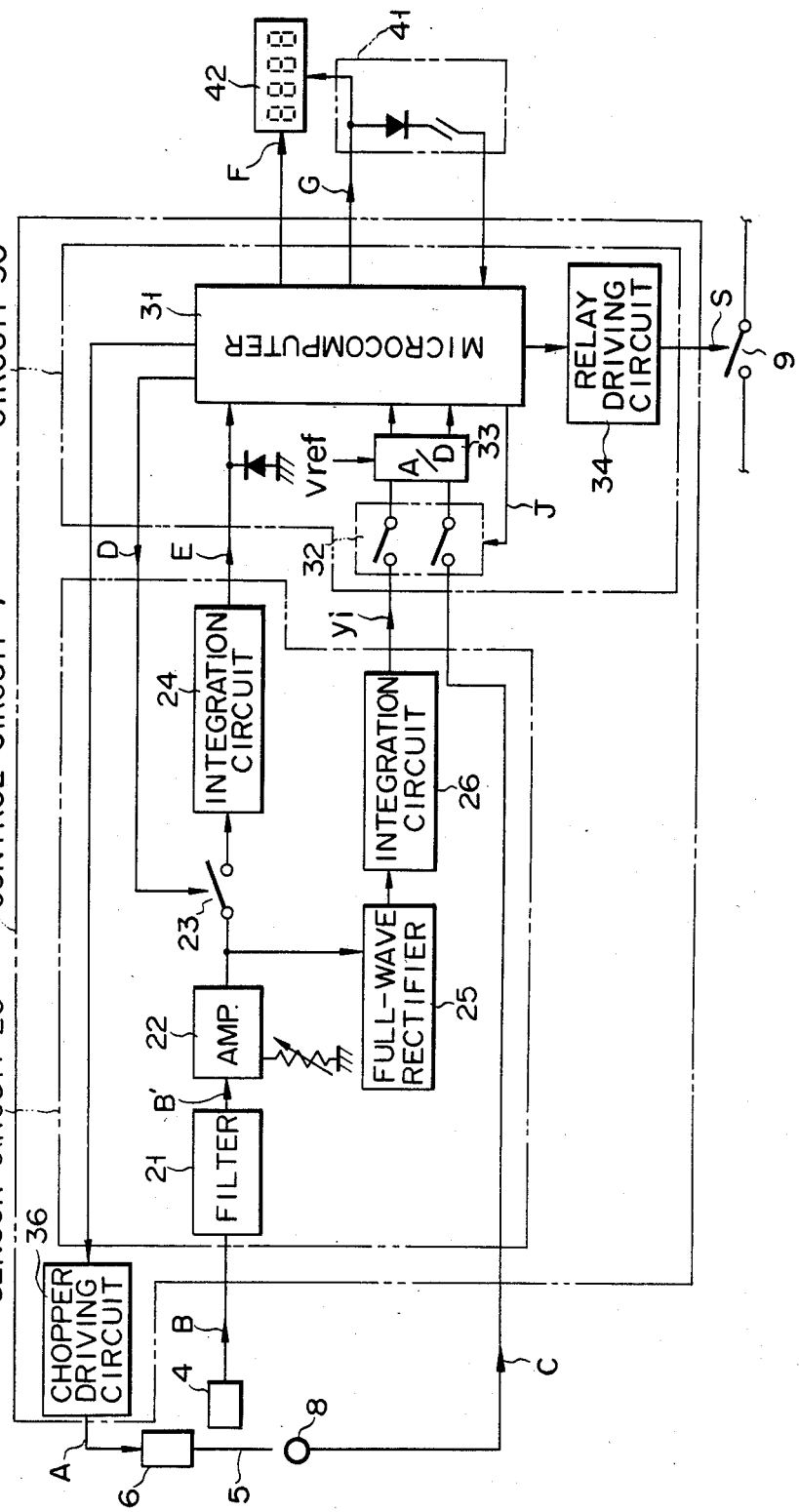
FIG. 3 is a block diagram of a control circuit shown in FIG. 2.

Referring to FIG. 3, the output signal of the infrared sensor 4, which is an electric output signal, is fed to a filter 21 in a sensor circuit 20 of the control circuit 7. The filter 21 removes a DC component from the sensor output signal B. Its AC output signal B' is amplified by an amplifier 22 and then fed through a switch 23 to an integrating circuit 24. The output of the amplifier 22 is also full-wave rectified by a full-wave rectifier 25 and then integrated by an integrating circuit 26.

The output E of the integrating circuit 24 in the sensor circuit 20 is supplied to a microcomputer 31 in an arithmetic operation circuit 30. The output $y_i$ of the integrating circuit 26 is fed together with the output signal C of the chopper temperature sensor 8 to a switch circuit 32. The switch circuit 32 selects the output signals $y_i$ and C in response to a switch command signal J from the microcomputer 31. The output signals $y_i$ and C from the switch circuit 32 are respectively converted by an A/D converter 33 into digital signals which are provided to the microcomputer 31. The microcomputer 31 supplies drive signals to a relay driving circuit 34 and a chopper driving circuit 36, which, in turn, respectively produce the on-off control signal S for on-off operation of the relay switch 9 and the drive signal A for the solenoid 6.

An operation panel having various operating keys is provided on the front surface of a cabinet of the microwave oven. The operating keys are connected to a key matrix circuit 41, which is scanned in accordance with a key scanning signal from the microcomputer 31. The operating panel also has a display unit 42 for displaying alpha-numerical data which the microcomputer 31 receives from the key matrix circuit 41. The display unit 42 may include a liquid crystal display device driven by a segment drive signal F and a digit drive signal G which are fed from the microcomputer 31.

Now, the operation of the circuit of FIG. 3 will be described with reference to the time chart of FIG. 4. After the food 2 is placed on the table 2a in the heating chamber 1, a door (not shown) is closed. Then, a timer (not shown) is set to be a desired cooking period of time and, a cooking button is depressed. As a result, cooking is started with power supplied to the magnetron 3. At the same time, the drive signal is supplied from the microcomputer 31 to the chopper driving circuit 36, so that the chopper driving circuit 36 feeds the drive signal A with a duty cycle of 50 percent, as shown in FIG. 4(a), to the solenoid 6. When the solenoid 6 is energized periodically in response to the drive signal A, the chopper 5 is brought to an "open" position, allowing the infrared radiation emitted from the food 2 to be detected by the infrared sensor 4. The solenoid 6 is de-energized during an alternative period of the signal A, and the chopper 5 is brought to a "block" position. In this position of the chopper 5, the infrared radiation emitted therefrom is detected by the infrared sensor 4.

In an initial stage of the cooking, the chopper 5 is substantially at room temperature. If the food 2 to be cooked is a frozen foodstuff, for example, its temperature is below the freezing point in the initial stage. In this stage, since the chopper temperature $x_{cp}$ is higher than the food temperature $x_f$, the output signal B of the infrared sensor 4 decreases in level while the chopper 5 is in the "open" position and increases while the chopper 5 is in the "block" position.

With the progress of the cooking, the temperature of the food 2 eventually exceeds the temperature of the chopper 5. Thereafter, the output level B of the infrared sensor 4 increases while the chopper 5 is in the "open" position. In either case, an AC signal B that varies in level according to the temperature $x_f$ of the food 2 and the temperature $x_{cp}$ of the chopper 5 is obtained from the infrared sensor 4.

The AC signal B has a DC component which is removed by the filter 21, and the output signal B' thereof is amplified by the amplifier 22 to a predetermined level. The amplified output signal is gated by the switch 23 under the control of a gating signal D as shown in FIG. 4(d). The gating signal D supplied from the microcomputer 31 has the same frequency as the drive signal A but shifts in phase therebehind by a predetermined period of time. With the gating operation of the switch 23, a positive going output signal shown in FIG. 4(e) is derived from the output signal B' shown in FIG. 4(b) when the temperature of the food 2 is equal to or higher than the temperature of the chopper 5, i.e., $x_f \geq x_{cp}$, or otherwise a negative going output signal shown in FIG. 4(f) is derived from the output signal B' shown in FIG. 4(c).

The output signal from the switch 23 is smoothed by the integrating circuit 24 so that there is provided a DC signal E which is higher or lower in level than a reference level as shown in FIG. 4(g). This DC signal E is fed to the microcomputer 31 as a discrimination signal for discriminating between $x_f \geq x_{cp}$ and $x_f < x_{cp}$.

The output signal of the amplifier 22 is also supplied to the full-wave rectifier 25, which, in turn, produces an output signal corresponding to the absolute value expressed by the equation (1). The output signal of the full-wave rectifier 25 is smoothed by the integrating circuit 26, whereby a DC output signal $y_i$ as shown in FIG. 4(h) is obtained.

Meanwhile, infrared radiation intensity $y_0$ of an object is generally given as $$Y_0 = aX^4 + b \quad (2)$$

where X is temperature (in Kelvin) of an infrared radiation source, and a and b are constants.

Denoting components with respect to food temperature $X_f$ and chopper temperature $X_{cp}$ in the infrared radiation intensity $y_0$ of an object respectively by $y_1$ and $y_2$, from the equation (2) we may state $$Y_1 = a_1 X_f^4 + b_1 \quad (3) \text{ and}$$

$$y_2 = a_2 X_{cp}^4 + b_2 \quad (4)$$

where $X_f(°K.)$ and $X_{cp}(°K.)$ are respectively the absolute temperature equivalents of $x_f(°C.)$ and $x_{cp}(°C.)$ If the infrared emissivities of the food 2 and the chopper 5 are substantially identical, then from equations (3) and (4) the DC output signal $y_i$ is given by $$\begin{aligned} y_i &= |y_1 - y_2| \\ &= |\beta(X_f^4 - X_{cp}^4)| \end{aligned} \quad (5)$$

where $\beta$ is a constant, $$X_f = 273 + x_f$$

and $$X_{cp} = 273 + x_{cp}.$$

The DC output signal $y_i$ is further given by $$\begin{aligned} y_i &= \left| \beta' \left[ \left(1 + \frac{x_f}{273}\right)^4 - \left(1 + \frac{x_{cp}}{273}\right)^4 \right] \right| \\ &= \left| \beta' \left[ \left(1 + \frac{x_f}{273}\right)^4 - 1 \right] - \beta' \left[ \left(1 + \frac{x_{cp}}{273}\right)^4 - 1 \right] \right| \\ &= |f(x_f) - f(x_{cp})| \end{aligned} \quad (6)$$

where $\beta' = \beta \times (273)^4$.

As is seen from the equation (6), there is no need of carrying out calculations by using absolute temperature values.

As discussed above, the output signal $y_i$ of the integrating circuit 26, as shown in FIG. 4(h), also represents the absolute value of a function with respect to the food temperature $x_f$ and the chopper temperature $x_{cp}$, defined by $$y_i = M = |f(x_f) - f(x_{cp})| \quad (7)$$

This analogue signal is converted by the A/D converter 33 into a digital signal, which is stored in a memory (not shown) of the microcomputer 31.

The chopper temperature sensor output signal C is also converted in the A/D converter 33 into a digital signal to be applied to the microcomputer 31. The memory of the microcomputer 31 has an area to store a function conversion table for converting the digital signal with respect to the chopper temperature $x_{cp}$ from the A/D converter 33 into a digital signal corresponding to a function $f(x_{cp})$.

Therefore, even if the output (sensitivity) characteristics of the chopper temperature sensor 8 are different from those of the infrared sensor 4, with reference to the conversion table the microcomputer 31 carries out arithmetic operations so as to provide the following digital output signal $$N = f(x_{cp}) \quad (8)$$

which, in turn, is stored in the memory.

If the level of the discrimination signal E from the integrating circuit 24 is higher than or equal to the reference one, i.e., $x_f \geq x_{cp}$, then the microcomputer 31 executes an adding operation to obtain $$\begin{aligned} T &= M + N = |f(x_f) - f(x_{cp})| + |f(x_{cp})| \\ &= f(x_f) \end{aligned} \quad (9)$$

where $f(x_f) \geq f(x_{cp}) > 0$.

If the signal level is lower than the reference one, i.e., $x_f < x_{cp}$, then a subtracting operation is executed to obtain $$\begin{aligned} T &= M - N = |f(x_f) - f(x_{cp})| - |f(x_{cp})| \\ &= f(x_f) \end{aligned} \quad (10)$$

where $f(x_{cp}) > f(x_f) > 0$.

With respect to data T the microcomputer 31 further executes the following arithmetic operation;

$$x_f = f^{-1}(T) \quad (11)$$

The equation (11) represents that accurate data with respect to the temperature of the food 2 can be derived from the microcomputer 31. Detected temperature data are compared with a programmed temperature preset in the microcomputer 31. According to the result of the comparison, a driving signal is supplied to the relay driving circuit 34 to on-off control the relay switch 9.

As has been described in the foregoing, according to the invention the output signal of the chopper temperature sensor 8 is converted into a signal corresponding to the output characteristics of the infrared sensor 4 so that the converted signal can be used for a correction signal for the infrared sensor output signal. Thus, accurate and reliable food temperature can be obtained irrespective of a temperature change of the chopper 5 due to an ambient temperature rise from room temperature or a temperature rise of the magnetron 3.

The microcomputer 31 described above may be replaced with an arithmetic circuit comprising as operational amplifier or the like.

In the above-mentioned embodiment, the infrared sensor 4 made of an infrared sensitive material LiTaO$_3$, for instance, and the chopper temperature sensor 8 consisting of a thermistor are used. The infrared sensor 4 and the chopper temperature sensor 8 may also be made of an identical material such as LiTaO$_3$. In case, however, that these sensors 4 and 8 have different characteristics, it is possible to correct the output signal of the sensor 4 or 8.

Further, while the previous embodiment has concerned with the determination of the temperature of the food in the microwave oven, the invention is applicable to the measurement of the temperature of any other object as well.

What is claimed is:

1. A temperature measuring apparatus comprising:
   a chopper for intermittently blocking infrared radiation emitted from an object;
   a chopper temperature sensor for measuring temperature of said chopper;
   an infrared sensor including a receiving surface for receiving infrared radiation from the object and said chopper alternately,
   said infrared sensor having output characteristic function f(x) where x generally represents temperature of the object and that of said chopper respectively and producing an output signal corresponding to $f(x_f) - f(x_{cp})$ if temperature $x_f$ of the object $\geq$ that $x_{cp}$ of said chopper and $f(x_{cp}) - f(x_f)$ if $x_f < x_{cp}$, on condition that a chopping duty cycle of said chopper is substantially equal to fifty percent while infrared emissivity of the object is considered to be identical to that of said chopper; and
   a control circuit for deriving a signal corresponding to the temperature $x_f$ of the object from the output signals of said infrared sensor and said chopper temperature sensor, said control circuit including
   first means for providing an output signal indicative of an absolute value $M = |f(x_f) - f(x_{cp})|$ of the output signal of said infrared sensor,
   second means for converting the output signal of said chopper temperature sensor into a signal corresponding to $N = f(x_{cp})$,
   third means for discriminating between $x_f \geq x_{cp}$ and $x_f < x_{cp}$,
   fourth means for executing adding operation of $T = M + N$ if the output signal of said discriminating means indicates $x_f \geq x_{cp}$ while executing subtracting operation of $T = M - N$ if the output signal of said discriminating means indicates $x_f < x_{cp}$, and
   fifth means for executing arithmetic operation of $x_f = f^{-1}(T)$.

2. A temperature measuring apparatus according to claim 1, wherein said first means includes a full-wave rectifier circuit for full-wave rectifying the output signal of said infrared sensor, and said second means includes a memory means having a memory area for storing a function conversion table for converting the output signal of said chopper temperature sensor.

3. A temperature measuring apparatus according to claim 2, wherein said third means includes a switch for switching the output signal of said infrared sensor at predetermined intervals, and an integrating circuit for integrating an output signal of said switch for generating a discrimination signal.

4. A temperature measuring apparatus comprising:
   a chopper for intermittently blocking infrared radiation emitted from an object;
   a chopper temperature sensor for measuring temperature of said chopper;
   an infrared sensor including a receiving surface for receiving infrared radiation from the object and said chopper alternately,
   said infrared sensor having output characteristic function f(x) where x generally represents temperature of the object and that of said chopper respectively and producing an output signal corresponding to $f(x_f) - f(x_{cp})$ if temperature $x_f$ of the object $\geq$ that $x_{cp}$ of said chopper and $f(x_{cp}) - f(x_f)$ if $x_f < x_{cp}$, on condition that a chopping duty cycle of said chopper is substantially equal to fifty percent while infrared emissivity of the object is considered to be identical to that of said chopper; and
   a control circuit for deriving a signal corresponding to the temperature $x_f$ of the object from the output signals of said infrared sensor and said chopper temperature sensor, said control circuit including
   a full wave rectifier circuit for providing an output signal indicative of an absolute value $M = |f(x_f) - f(x_{cp})|$ of the output signal of said infrared sensor,
   an A/D converter for converting the output signal of said full wave rectifier circuit into a first digital signal corresponding to the absolute value $M = |f(x_f) - f(x_{cp})|$ and for converting the output signal of said chopper temperature sensor into a second digital signal,
   a switch for switching the output signal of said infrared sensor substantially in response to the chopping duty cycle of said chopper,
   an integrating circuit for integrating an output signal of said switch to discrimate between $x_f \geq x_{cp}$ and $x_f < x_{cp}$, and
   a microcomputer coupled to said A/D converter and said integrating circuit,
   said microcomputer converting the output signal of said second digital signal of said A/D converter into a digital signal corresponding to $N = f(x_{cp})$, executing adding operation of $T = M + N$ in response to the signal corresponding to $N = f(x_{cp})$ and the first digital signal of said A/D converter if the output signal of said integrating circuit indicates $x_f \geq x_{cp}$ while executing subtracting operation of $T = M - N$ if the output signal of said integrating circuit indicates $x_f < x_{cp}$, and executing arithmetic operation of $x_f = f^{-1}(T)$.

* * * * *